United States Patent [19]

Miki

[11] Patent Number: 5,741,347
[45] Date of Patent: Apr. 21, 1998

[54] METHOD FOR PRODUCING COPPER POWDER

[75] Inventor: Hisashi Miki, Kyoto, Japan

[73] Assignee: Murata Manufacturing Co., Ltd., Kyoto, Japan

[21] Appl. No.: 596,671

[22] Filed: Feb. 5, 1996

[30] Foreign Application Priority Data

Feb. 24, 1995 [JP] Japan ..................... 7-037206

[51] Int. Cl.$^6$ ..................... B22F 9/24
[52] U.S. Cl. ..................... 75/373; 423/43
[58] Field of Search ..................... 75/370, 371, 373; 423/43

[56] References Cited

U.S. PATENT DOCUMENTS 5,308,501  5/1994  Eckert ..................... 423/43

FOREIGN PATENT DOCUMENTS 58-96802   6/1983   Japan ..................... 75/373
4-116109   4/1992   Japan ..................... 75/373
6-10014    1/1994   Japan ..................... 75/373

*Primary Examiner*—George Wyszomierski
*Attorney, Agent, or Firm*—Ostrolenk, Faber, Gerb & Soffen, LLP

[57] ABSTRACT

A method for stably producing a copper powder having a low degree of oxidation comprises generating copper hydroxide by adding an alkali to an aqueous solution containing copper ions, and reducing the copper hydroxide to obtain copper powder as a precipitate by adding hydrazine or a hydrazine compound to the aqueous solution until the aqueous solution yield a pH value in a range of from about 7 to 9.

13 Claims, No Drawings

METHOD FOR PRODUCING COPPER POWDER

BACKGROUND OF THE INVENTION

1. Field of the Invention

The present invention relates to a method for producing a copper powder, and more particularly to a method for producing a copper powder of a low oxidation state, which is useful as an electrically conductive paste for forming thick films.

2. Prior Art

Instead of using a noble metal such as gold, silver or palladium, copper powder is being employed more frequently these days in an electrically conductive paste material for forming thick films. This is because copper possesses excellent properties such as high conductivity and resistance against migration, and, in addition, it is available at a relatively low cost.

Copper powder of the type for use as a thick-film conductive paste material has been produced by reducing a copper salt sparingly soluble in water, such as copper carbonate, using a reducing agent. However, this method results in a copper powder composed of coarse particles having a primary particle diameter of 1 μm or larger, and the particles are often found agglomerated.

Recently, copper powder produced from a water-soluble salt such as copper sulfate has become available. The water-soluble salt is converted into a hydroxide and then reduced to obtain the copper powder. The resulting copper powder consists of particles having a primary diameter of 1 μm or smaller, and less agglomeration occurs with this powder. As a result, a dense conductive film can be obtained by using the copper powder as the conductive material. Moreover, when compared to a copper powder obtained by the conventional method using copper carbonate, the copper powder using a water-soluble copper salt provides, for instance, a capacitor electrode which is improved not only in electrical characteristics such as static capacitance, dielectric loss or insulation resistance, but also in mechanical properties.

However, according to the above-explained conventional method, copper peroxide ($CuO_2$) tends to be generated during the production of copper hydroxide, and cuprous oxide ($Cu_2O$) tends to form during the reduction of copper hydroxide to copper powder. This signifies that a copper powder having a high oxidation state may result from the process. When a copper powder of a high oxidation state is used as a conductive material, soldering failure can occur. Furthermore, capacitors with impaired electric properties are obtained when such a copper powder is utilized for the electrodes thereof, resulting in a low static capacitance, a high dielectric loss, etc.

SUMMARY OF THE INVENTION

An objective of the present invention is to provide a method for stably producing copper powder having a low oxidation state. Such a method for producing a copper powder comprises the steps of generating copper hydroxide by adding an alkali to an aqueous solution containing copper ions and reducing the copper hydroxide to obtain the copper powder as a precipitate by adding hydrazine or a hydrazine compound to the aqueous solution until the aqueous solution has a pH value in a range of from about 7 to 9. According to the present invention, a copper powder having low degree of oxidation and containing less residual copper oxides can be obtained by controlling the final pH to a range of from 7 to 9 after adding hydrazine or a compound thereof as a reducing agent.

By forming a conductor by coating and firing a conductive paste prepared from the copper powder according to the present invention, a thick film copper conductor having excellent solderability can be obtained.

DETAILED DESCRIPTION OF THE INVENTION

The method for producing a copper powder of the present invention is characterized in that it comprises generating copper hydroxide by adding an alkali to an aqueous solution containing copper ions, and reducing the copper hydroxide to obtain copper powder as a precipitate by adding hydrazine or a hydrazine compound to the aqueous solution until the aqueous solution has a pH value in a range of from about 7 to 9.

The method of the present invention is also characterized in that hydrazine or the hydrazine compound is preferably added at a quantity corresponding to about 1 to 3 times the theoretical value necessary for reducing copper hydroxide to copper powder.

The reason why the pH value during the reduction is limited to a range of from 7 to 9 is explained below.

In general, a reductive reaction of copper hydroxide [$Cu(OH)_2$] proceeds by first forming an intermediate product, cuprous oxide ($Cu_2O$), and then forming the final product, copper (Cu), in a manner expressed below:

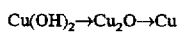

Any intermediate product, i.e., cuprous oxide, which remains to the final stage increases the oxidation state of the copper powder. Thus, it can be seen that it is required to completely eliminate cuprous oxide by thoroughly reducing the starting copper oxide to copper powder.

On the other hand, it is known that hydrazine ($N_2H_4$) or a hydrazine compound, which is a reducing agent, decompose based on the following equation and exhibits reductive action:

Hydrazine and hydrazine compounds are stable at a lower pH range, but decomposes more vigorously with increasing pH value.

It can be seen from the foregoing that the pH value during the reductive reaction is adjusted to as high as possible, but not in excess of about 9, to prevent cuprous oxide from remaining after the reduction of copper hydroxide to copper powder. A preferred pH range is from about 7 to 9. It is more preferable to set a pH about 8. A pH value lower than 7 or higher than 9 is not preferred. If the pH value should be set lower than 7, the quantity of the intermediate product, i.e., cuprous oxide, which remains after the reduction reaction, increases. If the pH value is set at a value exceeding 9, it is more likely that copper hydroxide is oxidized into copper peroxide ($CuO_2$). Eventually, non-reduced copper peroxide and half-reduced cuprous oxide are found to remain in large quantity because copper peroxide is extremely resistant to reduction.

In an embodiment according to the present invention, the hydrazine or hydrazine compound is added in a quantity corresponding to about 1 to 3 times the theoretical (stoichiometric) value necessary for reducing copper hydroxide to copper. If hydrazine or a compound thereof is added at a quantity less than the stoichiometric value for the reduction of copper hydroxide into copper, the reduction reaction may be incomplete, and non-reacted cuprous oxide would remain. If the amount of addition should exceed three times the stoichiometric value, the excess hydrazine or a compound thereof would be consumed and this not economic.

Thus, as described in the foregoing, the method for producing copper powder according to the present invention comprises adding hydrazine or a hydrazine compound to an aqueous solution containing copper hydroxide until the pH value of the solution is adjusted in a range of from about 7 to 9 to thereby effect a reducing reaction. In this manner, copper powder having a low degree of oxidation is obtained by preventing copper oxide such as cuprous oxide from remaining in the powder.

Furthermore, the reduction reaction can be completed economically and efficiently by controlling the addition of the reducing agent, i.e., hydrazine or a compound thereof, to fall in a quantity corresponding to about 1 to 3 times the theoretical value necessary for reducing copper hydroxide to copper powder. Preferably the amount of reducing agent is greater than stoichiometric.

The present invention is described in further detail below by making reference to some non-limiting examples.

EXAMPLE 1

An aqueous copper sulfate solution was obtained by dissolving 150 g of copper sulfate into 500 ml of pure water at 60° C., and an aqueous alkaline solution prepared separately by dissolving sodium hydroxide into 1,000 ml of pure water at a quantity equimolar to $Cu^{2+}$ was added in the aqueous copper sulfate solution until the pH value of the solution became 4. A total of 200 ml of aqueous alkaline solution were added. Thus was obtained copper hydroxide. Then, hydrazine hydrate was added to the resulting aqueous solution containing copper hydroxide until the pH value of the solution became 9. Copper powder was obtained through the reduction of copper hydroxide in this manner by adding 200 ml of hydrazine hydrate to the solution. Subsequently, the copper powder was filtered off, and was dried after exchanging the adsorbed water by methanol.

The copper powder thus obtained was subjected to X-ray diffraction analysis to calculate $Cu_2O/Cu$ ratio by weight from the intensity ratio of the peaks observed in the diffractogram. The result is shown in Table 1.

A conductive paste was prepared from the copper powder. The resulting paste was applied to a ceramic substrate and was fired to evaluate the solderability of the conductor.

More specifically, a conductive paste was prepared by kneading 80% by weight of the copper powder, 5% by weight of a Pb—B—Zn based glass powder, and 15% by weight of an organic vehicle obtained by dissolving an acrylic resin into α-terpineol solvent. The conductive paste thus obtained was applied to an alumina substrate by screen printing, and was fired at 600° C. under an atmosphere containing 1,000 ppm or less of oxygen.

Subsequently, a flux obtained by dissolving rosin into methanol was applied to the conductive portion, and the resulting structure was immersed into a Sn—Pb eutectic solder melt at 230° C. for a duration of 5 seconds. The solderability was evaluated by the wet area ratio of the conductor immersed into the solder melt. The result is given in Table 1.

EXAMPLE 2

An aqueous solution was obtained by dissolving 1,000 g of copper chloride into 3,000 ml of pure water at 70° C., and an aqueous alkaline solution prepared separately by dissolving sodium hydroxide into 1,000 ml of pure water at a quantity equimolar to $Cu^{2+}$ was added in the aqueous solution until the pH value of the solution became 3.5. A total of 900 ml of aqueous alkaline solution were added. Thus was obtained copper hydroxide. Then, hydrazine hydrate was added to the resulting aqueous solution containing copper hydroxide until the pH value of the solution became 7. In this manner, copper powder was obtained through the reduction of copper hydroxide by adding 900 ml of hydrazine hydrate to the solution. Subsequently, copper powder was filtered off, and was dried after exchanging the adsorbed water by methanol.

The copper powder thus obtained was subjected to X-ray diffraction analysis to calculate $Cu_2O/Cu$ ratio by weight from the intensity ratio of the peaks observed in the diffractogram. The result is shown in Table 1.

A conductive paste was prepared in the same manner as in Example 1 except for using the copper powder obtained above, and the resulting conductive paste was applied and fired for the evaluation of the solderability of the resulting conductor. The result is given in Table 1.

COMPARATIVE EXAMPLE 1

An aqueous solution was obtained by dissolving 400 g of copper sulfate into 1,000 ml of pure water at 60° C., and an aqueous alkaline solution prepared separately by dissolving sodium hydroxide into 1,000 ml of pure water at a quantity equimolar to $Cu^{2+}$ was added in the aqueous solution until the pH value of the solution became 4. A total of 500 ml of aqueous alkaline solution were added. Thus was obtained copper hydroxide. Then, hydrazine hydrate was added to the resulting aqueous solution containing copper hydroxide until the pH value of the solution became 6. A copper powder was obtained in this manner through the reduction of copper hydroxide. The total amount of hydrazine hydrate added into the solution was 300 ml. Subsequently, the copper powder was filtered off, and was dried after exchanging the adsorbed water by methanol.

The copper powder thus obtained was subjected to X-ray diffraction analysis to calculate $Cu_2O/Cu$ ratio by weight from the intensity ratio of the peaks observed in the diffractogram. The result is shown in Table 1.

A conductive paste was prepared in the same manner as in Example 1 except for using the copper powder obtained above, and the resulting conductive paste was applied and fired for the evaluation of the solderability of the resulting conductor. The result is given in Table 1.

COMPARATIVE EXAMPLE 2

An aqueous solution was obtained by dissolving 1,000 g of copper sulfate into 2,000 ml of pure water at 65° C., and an aqueous alkaline solution prepared separately by dissolving sodium hydroxide into 2,000 ml of pure water at a quantity twice the molar content of $Cu^{2+}$ was added in the aqueous solution until the pH value of the solution became 4. A total of 1,100 ml of aqueous alkaline solution were added. Thus was obtained copper hydroxide. Then, hydrazine hydrate was added into the resulting aqueous solution containing copper hydroxide until the pH value of the solution became 10. A copper powder was obtained in this manner through the reduction of copper hydroxide. The total amount of hydrazine hydrate added into the solution was 1,000 ml. Subsequently, the copper powder was filtered off, and was dried after exchanging the adsorbed water by methanol.

The copper powder thus obtained was subjected to X-ray diffraction analysis to calculate $Cu_2O/Cu$ ratio by weight from the intensity ratio of the peaks observed in the diffractogram. The result is shown in Table 1.

A conductive paste was prepared in the same manner as in Example 1 except for using the copper powder obtained above, and the resulting conductive paste was applied and fired for the evaluation of the solderability of the resulting conductor. The result is given in Table 1.

TABLE 1

|  | Final pH in reductive reaction | $Cu_2O/Cu$ (wt ratio) | Solder-wetted area ratio (%) |
| --- | --- | --- | --- |
| Ex 1 | 9 | 0.019 | $\geq 80$ |
| Ex 2 | 7 | 0.017 | $\geq 80$ |
| Comp. Ex. 1 | 6 | 0.049 | $\leq 50$ |
| Comp. Ex. 2 | 10 | 0.033 | $\leq 50$ |

From the results shown in Table 1, it can be seen that the copper powders obtained by the method according to the present invention yield a low degree of oxidation with a $Cu_2O/Cu$ ratio (by weight) in a low range of from 0.017 to 0.019. Furthermore, as is evaluated by the solder-wetted area ratio of 80% or higher, it can be seen that the solderability of the conductor using the copper powder according to the present invention is favorable.

In contrast to the results above for the copper powder of the present invention, the powder obtained with a final pH value of lower than 7 at the completion of the reduction reaction (Comparative Example 1) yields a $Cu_2O/Cu$ ratio as high as 0.049, and the conductor which results therefrom by coating and baking yields an unfavorable solder-wetted area ratio of 50% or lower. Furthermore, the powder obtained with a final pH value exceeding 9 at the completion of the reduction reaction (Comparative Example 2) also yields a $Cu_2O/Cu$ ratio as high as 0.033, and the conductor which results therefrom by coating and baking yields an unfavorable solder-wetted area ratio of 50% or lower.

Although the aqueous solution containing copper ions is obtained by dissolving copper sulfate or copper chloride into pure water in the Examples above, the present invention is not only limited thereto. Any water-soluble copper compound such as copper nitrate can be used in the place of copper sulfate or copper chloride.

Furthermore, in the production of copper hydroxide, any other alkali such as ammonia, potassium hydroxide, etc., can be used in the place of sodium hydroxide.

The reducing agent employed above is hydrazine hydrate. However, various other hydrazine compounds such as hydrazinium chloride or hydrazinium sulfate can be used as well.

While the invention has been described in detail and with reference to specific embodiments thereof, it will be apparent to one skilled in the art that various changes and modifications can be made therein without departing from the spirit and scope thereof.

What is claimed is:

1. A method for producing a copper powder which comprises combining a liquid consisting essentially of an aqueous acidic solution containing $Cu^{2+}$ with a hydrazine compound reducing agent until the aqueous solution has a pH value in the range of about 7 to 9 whereby the $Cu^{2+}$ is reduced to form copper powder.

2. A method for producing a copper powder as claimed in claim 1, wherein the hydrazine compound reducing agent is employed at a quantity corresponding to about 1 to 3 times the stoichiometric amount for reducing the $Cu^{2+}$ to copper powder.

3. A method for producing a copper powder as claimed in claim 2, wherein the hydrazine compound reducing agent is hydrazine hydrate.

4. A method for producing a copper powder as claimed in claim 3, comprising the step of forming an aqueous acidic solution containing $CU^{2+}$ of copper hydroxide by combining a aqueous solution containing copper ions with an alkali.

5. A method for producing a copper powder as claimed in claim 4, wherein the copper powder formed is separated from the aqueous solution.

6. A method for producing a copper powder as claimed in claim 1, wherein the copper powder formed is separated from the aqueous solution.

7. A method for producing a copper powder as claimed in claim 1, comprising the step of forming an aqueous acidic solution containing $Cu^{2+}$ by combining a aqueous solution containing copper ions with an alkali.

8. A method for producing a copper powder as claimed in claim 7 in which the aqueous solution is combined with the alkali until a pH value of 3.5 to 4 is obtained.

9. A method of producing a copper powder as claimed in claim 7 in which the aqueous solution containing copper ions is an aqueous solution of a copper compound selected from the group consisting of copper sulfate, copper chloride and copper nitrate.

10. A method of producing a copper powder as claimed in claim 7, wherein the alkali is selected from the group consisting of sodium hydroxide, ammonia and potassium hydroxide.

11. A method for producing a copper powder as claimed in claim 1, wherein the hydrazine compound reducing agent is hydrazine hydrate.

12. A method for producing a copper powder as claimed in claim 1, wherein the hydrazine compound reducing agent is hydrazinium chloride or hydrazinium sulfate.

13. A method of producing a copper powder as claimed in claim 1, wherein the hydrazine compound reducing agent is combined until the aqueous solution has a pH value of about 8.

* * * * *